United States Patent [19]
Albrecht et al.

[11] Patent Number: 5,599,589
[45] Date of Patent: Feb. 4, 1997

[54] APPARATUS AND PROCESS FOR PRODUCING ORGANIC MONO MOLECULAR OR MULTILAYER FILMS

[75] Inventors: Otto Albrecht, Atsugi; Hiroshi Matsuda, Isehara, both of Japan

[73] Assignee: Canon Kabushiki Kaisha, Tokyo, Japan

[21] Appl. No.: 423,697

[22] Filed: Apr. 18, 1995

[30] Foreign Application Priority Data

Apr. 22, 1994 [JP] Japan .................................. 6-084496
Mar. 24, 1995 [JP] Japan .................................. 7-066014

[51] Int. Cl.$^6$ ............................. B05D 1/20; B05C 3/02
[52] U.S. Cl. .................................. 427/430.1; 427/434.3; 118/402; 118/692; 118/694
[58] Field of Search ................ 427/8, 430.1, 434.3; 118/402, 692, 694

[56] References Cited

U.S. PATENT DOCUMENTS

| | | | |
|---|---|---|---|
| 4,722,856 | 2/1988 | Albrecht et al. | 118/402 |
| 4,783,348 | 11/1988 | Albrecht et al. | 427/402 |
| 5,143,745 | 9/1992 | Maganas et al. | 118/402 |

FOREIGN PATENT DOCUMENTS

| | | |
|---|---|---|
| 2104316 | 2/1994 | Canada . |
| 0335620 | 10/1989 | European Pat. Off. . |
| 0518366 | 12/1992 | European Pat. Off. . |
| 0583676 | 2/1994 | European Pat. Off. . |
| 4105049 | 8/1992 | Germany . |
| WO8704090 | 7/1987 | WIPO . |
| WO9001998 | 3/1990 | WIPO . |

OTHER PUBLICATIONS

O. Albrecht et al., "Industrial Scale Production of LB–Layers", Molecular Electronics, Biosensors and Biocomputers, edited by F. T. Hong, NY 1989 pp. 41–45. (no month date).

W. Nitsch et al., "Convective Monolayer Compression in Channel Flow: Behaviour and Transfer of Soluble and Insoluble Films", Thin Solid Films, 178 (1989) pp. 145–155 (no month date).

Patent Abstracts of Japan, vol. 11, No. 202 (c–432) Jun. 30, 1987; JP–62 027069.

Database WPI, Section Ch, week 9310, Derwent Publications Ltd; class A89, AN93–081489 & JP–A–05028547 (no date).

Database WPI, Section Ch, week 9045, Derwent Publications Ltd, Class A89, AN 90–338790 & JP–A–02 244 611 (no date).

Database WPI, Section Ch, week 9101 Derwent Publications Ltd., class A88, An 91–003707 JP A 02 280821 (no date).

Patent Abstracts of Japan, vol. 15, No. 048 (C–0802). Feb. 5, 1991 & JPA 02 28821.

*Primary Examiner*—Katherine Bareford
*Attorney, Agent, or Firm*—Fitzpatrick, Cella, Harper & Scinto

[57] ABSTRACT

An apparatus and process for producing organic monomolecular or multilayer films continuously comprises a tank having a spreading region (S) for spreading a material to form a monomolecular film, a compression region (C) for compressing the material on the liquid surface to form the monomolecular film and a deposition region (D) where the monomolecular film is deposited on a substrate. Means is provided to cause liquid to flow continuously from the spreading region to the deposition region through the compression region. A first control means is provided to maintain the liquid level in the deposition region D at a predetermined level. A second control means is provided for regulating the surface pressure of the monomolecular film at a predetermined value. Fluid flow through the apparatus is regulated so that the thickness of the liquid flow in the region C is less than thickness of the liquid flow in the regions S and D, and a decoupling region DS is provided between the region S and the region C. The provision of the decoupling region DS permits more stable film production.

17 Claims, 3 Drawing Sheets

APPARATUS AND PROCESS FOR PRODUCING ORGANIC MONO MOLECULAR OR MULTILAYER FILMS

FIELD OF THE INVENTION

This invention relates to an apparatus for continuously producing Langmuir-Blodgett film (LB film).

RELATED BACKGROUND ART

LB film is an organic film comprising a monomolecular film or multilayer film in which a plurality of monomolecular layers of same or different kinds of organic material are laminated. The thickness of each monomolecular film depends the length of the molecules making up the LB film. "LB films" were discovered by Irving Langmuir and Katherine Blodgett and are generally produced in accordance with the following procedure. A material to form the film is dissolved in a suitable solvent. Then a small amount of the solution is allowed to spread over a clean surface of a liquid, in particular, over a surface of pure water, and then the solvent is allowed to evaporate or disperse into the liquid phase. As a result a loosely packed film of the molecules forms on the liquid surface. The surface is then swept by means of a barrier wall to reduce the area of the loosely packed film mechanically, compress the film and increase its density to give a tightly packed monomolecular film. Next, a solid substrate is immersed in the liquid and then raised e.g. vertically through the monomolecular film on the liquid surface while maintaining the surface density of the molecules constituting the monomolecular film. Under these conditions, the monomolecular film transfers to the substrate and is deposited as a monomolecular film on the substrate. By repeated immersing and raising of the substrate, multilayer monomolecular films, that is an LB film, having an integer times thickness of that of the monomolecular film, can be formed on the substrate.

The surface density of the monomolecular film on the liquid surface can be monitored by measuring a surface pressure, that is the difference between the surface tension of the liquid and the surface tension of the area which is covered with the monomolecular film.

In the process of film deposition it is important for almost all LB film forming materials to maintain the surface pressure of the monomolecular film within a narrow range. The reason why regulation is important is that the orientation of the molecules in the monomolecular film changes as the surface pressure changes. That is, when the surface pressure is changed while the LB film is being formed, the orientation in the film is disturbed, and if the orientation is highly disturbed, an LB film might not be produced. The range of tolerance or fluctuation of the surface pressure depends on the material for the LB film and/or the surface pressure for producing the LB film, but it is usual for the surface pressure, to be maintained within 1 mN/m. The surface pressure is usually adjusted by sweeping the barrier wall over the surface to enhance or reduce the area of the liquid surface over which the LB film forming molecules are spread, as described above. Therefore, in order to maintain the surface pressure within a given range it is necessary to control the position of the barrier wall in response to the surface pressure.

However, where because of the rapidity of the deposition or the rigidity of the monomolecular film, the change in position of the barrier wall or the response of the film is too slow compared with changes in the measured surface pressure, feedback control may not operate correctly and the surface pressure may oscillate and consequently the position of the barrier wall may oscillate. For example ±3 mN/m of oscillation may occur. Where the amplitude of oscillation is larger than the above value, the instability in surface pressure means that an LB film is not formed. In particular, if the surface pressure attains a high positive value, the monomolecular film on the liquid surface irreversibly collapses, so that such fluctuations must be restricted. Hitherto, the LB films have been produced and film deposition and other procedures have been carried out using film balance apparatus comprising a water tank containing the liquid phase, a barrier wall, a surface pressure gauge and an apparatus for immersing and raising a substrate to be coated or re-coated with an LB film. The quantity of the monomolecular film on the liquid surface and the area of the monomolecular film, depend on the size of the water tank. The area cannot be larger than the surface area of the liquid phase, and actually the monomolecular film is compressed by the barrier wall so that its area is usually smaller than the surface area of the liquid phase. Thus, the total area of the LB film which can be formed on the substrate in a single operation is the same as or less than the area of the monomolecular film which is originally formed on the liquid surface.

Where it is required to produce on a substrate an LB film having a larger area than the area of the monomolecular film formed on the liquid surface, the following procedure is required. First, any residual monomolecular film on the liquid surface is removed to give a clean surface. An example of where this cleaning operation is required is where a monomolecular film remains in insufficient quantity to form a film on the intended substrate in a single operation of immersing and raising the substrate, or where the residual monomolecular film is present in parts which cannot be compressed or controlled by movement of the barrier wall due to apparatus restrictions. Next, the LB film forming material is spread on the liquid surface, and then the molecules of the film forming substance which are present on the liquid surface are compressed to form a monomolecular film which can be used to make the LB films. However, the above described LB film producing process is a batch process so that it is not suitable for mass production.

Various methods have been put forward to meet the need to be able to mass produce LB films. Examples of such disclosures include U.S. Pat. No. 4,783,348 (O. Albrecht et al), an article by O. Albrecht et al, "Industrial Scale Production of LB-Layers", Molecular Electronics, Biosensors and Biocomputers, edited by F. T. Hong, Plenum Press, N.Y. 1989, pages 41–49, and an article by W. Nitsch et al, "Convective Compression in Channel Flow: Behaviour and Transfer of Soluble and Insoluble Films" Thin Solid Films, Vol. 178, 1989, pages 145–155.

Now an apparatus and process proposed by O. Albrecht et al for producing the LB film continuously will be explained with reference to FIG. 2. The apparatus shown in FIG. 2 comprises a channel 20 having three parts, a spreading region (S), a compression region (C) and a depositing region (D). Pure water flows from the region S to the region D through the region C.

Figure 2:
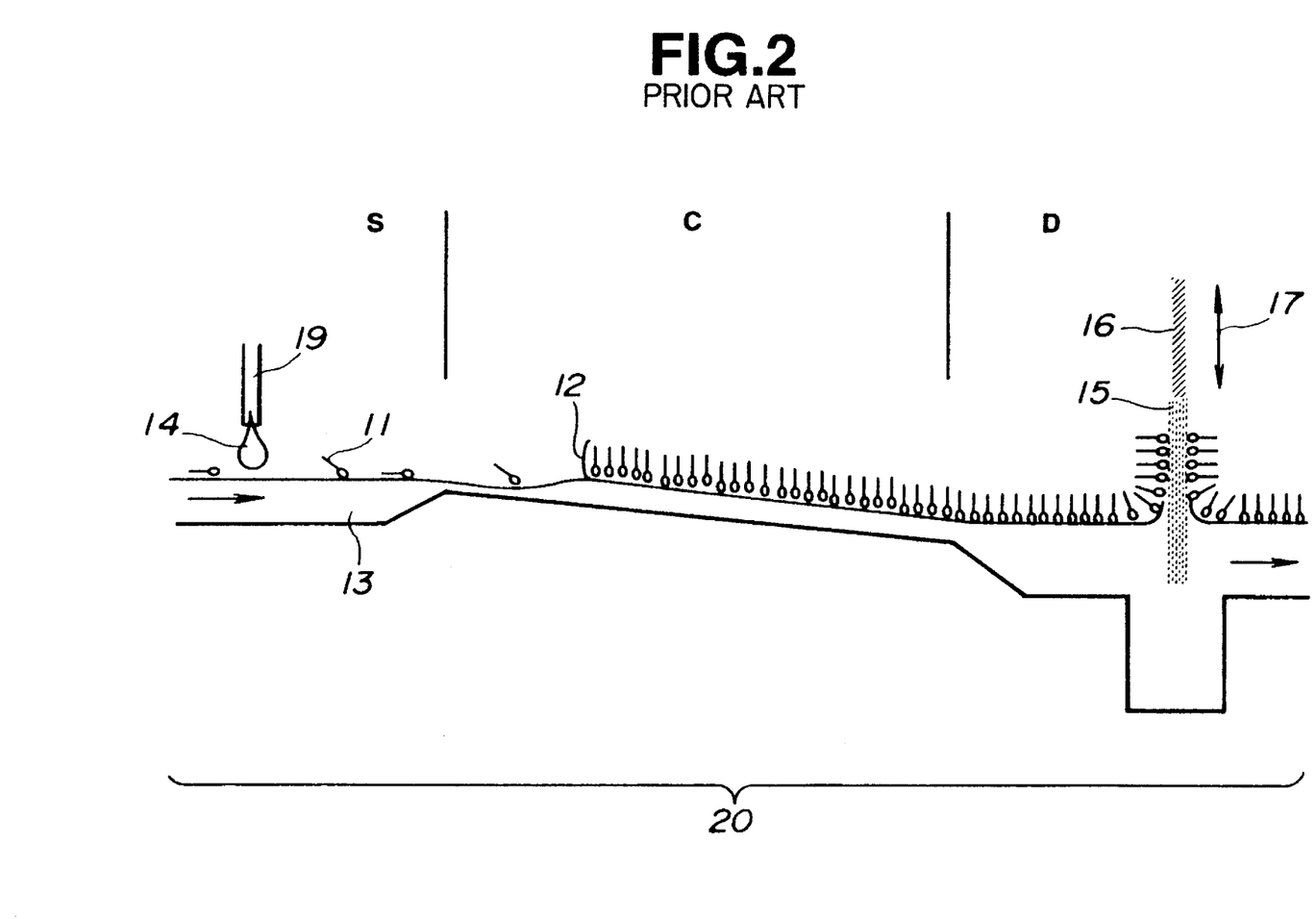
FIG. 2 is a schematic view showing a conventional apparatus for producing an LB film as has already been described.

First, in the region S, a solution 14 containing a material of which the LB film consists is dropped from a nozzle 19, onto the surface of a flow of pure water. The material spreads out on the water phase 13. In FIG. 2 the molecules of the LB film forming material are represented by the reference numeral 11. Then the spread LB film forming material is transferred in the water flow to the region C while the solvent of the solution 14 evaporates. The LB film-forming material becomes compressed in the region C and a monomolecular film 12 in which the molecules 11 are brought into an orientation is formed on the water surface in the regions C and D. In the region C, a stable flow is necessary to compress the material uniformly. Therefore the channel in the region C has a slope so that the water surface has a slight descent toward the region D.

In the region D, a substrate 15 is repeatedly immersed into the water phase and then raised by transferring means (16) which moves the substrate in the perpendicular direction (17) to the liquid surface. Therefore the monomolecular film 12 is deposited continuously on the substrate 15 to obtain an LB film.

In the process and the apparatus described above, where some material has already been provided to the water phase and some monomolecular film has already been formed in the region C and the region D, fresh material (solution) from the nozzle (19) is transported to the right as viewed in FIG. 2 until the fresh material is stopped by abutment with the end of the already formed monomolecular layer on the liquid surface in the region C. Therefore the new monomolecular layer grows in a direction opposite to the water flow i.e. in an upstream direction. Then, friction which occurs between the new monomolecular film and the water phase gives rise to additional surface pressure contributed by the new monomolecular film so that the surface pressure of the monomolecular film is increased. The surface pressure of the monomolecular film in the region D depends on the form of the container (hereinafter called "water tank") which retains the water phase and the material on the water phase, the water level and the strength of the water flow etc.

As described above, stable water flow is necessary in the region C. To cope with this requirement, the tank is preferably formed so that the water phase in the region C is thin. As a result, the water flow becomes laminar. However, the water phase in the region S must have adequate depth in order to prevent the water flow from being influenced by flow variations in this region. Furthermore, the depth of the water phase in the region D is preferably greater than that in region C in order to permit the substrate 15 to be immersed and to accommodate fluctuation in the amount of water which is drained.

The apparatus shown in FIG. 2 is provided with a region into which water is flowed, a region from which water is drained, a pump for maintaining the water flow, a level sensor in the region D and means for exchanging the water phase and for removing waste film, and these are not shown in FIG. 2.

Figure 3:
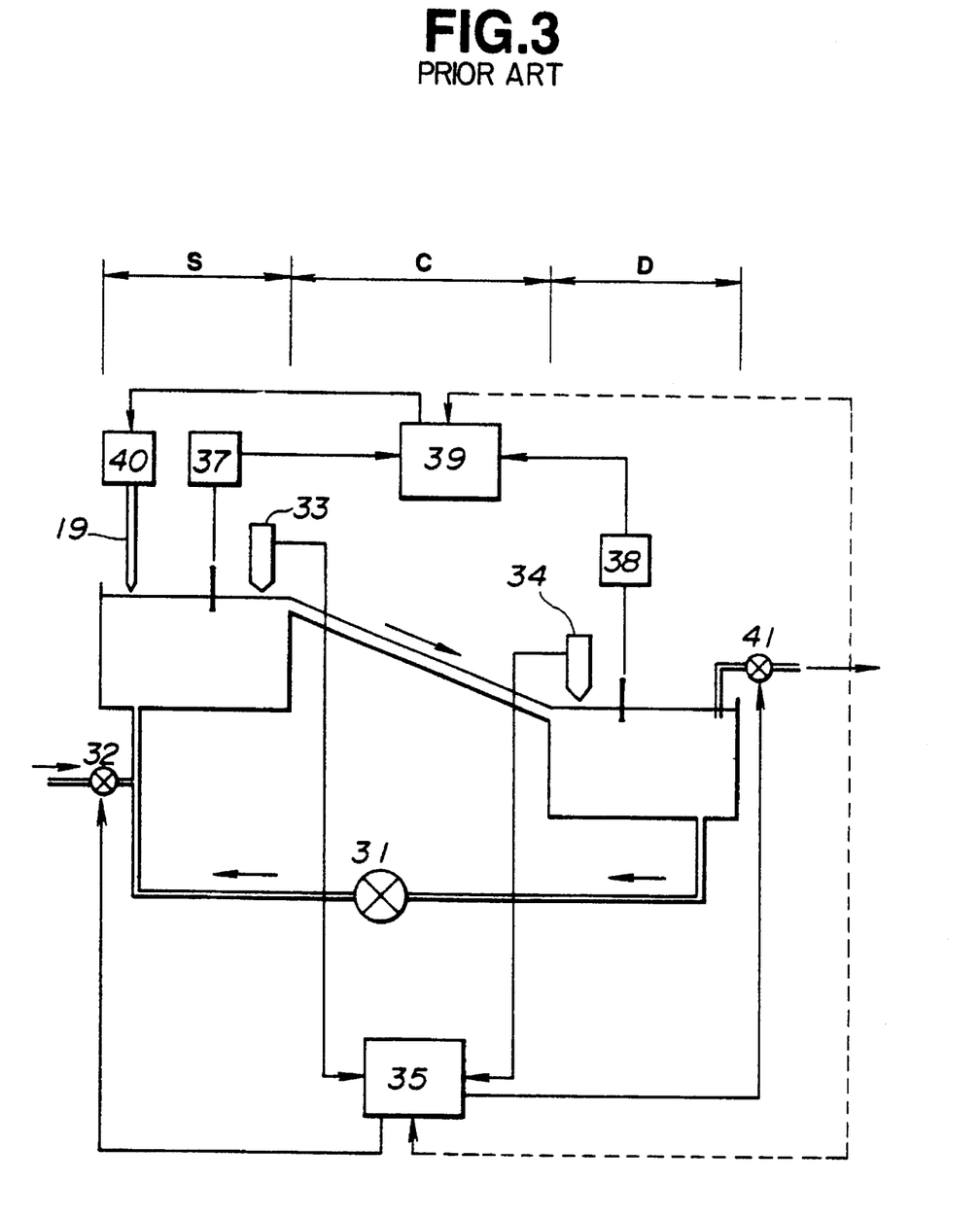
FIG. 3 is a schematic view showing a control loop for regulating surface pressure of the monomolecular film on the liquid surface and a control loop for regulating liquid level in the compression region in an apparatus for producing an LB film, said control loops being used in the apparatus of FIG. 1 or FIG. 2.

When the monomolecular film is formed on the water surface by using the apparatus described above, two feedback control loops are preferably operated as the water is caused to flow at an experimentally determined speed. One control loop regulates the water level in the region D by regulating the amount of water in the channel, and another control loop regulates the surface pressure of the monomolecular film on the liquid surface in the region D by regulating the speed of spreading the material on the water surface in the region S. When parameters of these control loops are set suitably, approximately 90% of the surface area in the region C is covered with the monomolecular film. FIG. 3 is a schematic view which illustrates the first and the second control loops.

Referring to FIG. 3, the apparatus has a channel having the spreading region, the compressing region and the depositing region, and water flows from the region S to the region D through the region C continuously. The flow is maintained by a pump 31, and water is provided to the channel through a valve 32 if it is required.

The operation of the first loop is as follows. The water level in the region S is monitored by a level sensor 33 and the water level in the region D is monitored by a level sensor 34. A water level controller 35 regulates the valve 32 which admits fresh supplies of water and a pump 41 which drains water from the region D if the water level is higher than the predetermined level according to outputs from the level sensors 33 and 34 to control the amount of the water in the channel. The levels in regions S and D are therefore regulated by feedback control.

Next, the second control loop will be explained. The surface pressure of the monomolecular film in the region S is monitored by a surface pressure sensor 37 and the surface pressure of the monomolecular film in the region D is monitored by a surface pressure sensor 38.

A surface pressure controller 39 regulates means 40 for dropping the solution from the nozzle 19 to control the speed at which the solution is spread on the region S. Then, feedback control of the surface pressure in the region D is operated.

However, in the technique described above in which two feedback loops are used, the water level and the surface pressure which are regulated by the two loops are not isolated from each other so that there is difficulty in achieving sufficiently precise regulation of the surface pressure of the monomolecular film on the liquid surface in the region D. The reason why the precise regulation is difficult is that the circumstances of the flow change between the upstream end of the channel and the downstream end of the channel. That is, the surface of the water flow at the upstream end is not covered with the monomolecular film, whereas the surface of the water flow in the downstream end is covered with the monomolecular film and the flow at the downstream end is sandwiched between the monomolecular film and the bottom surface of the tank. The effective thickness of the water flow in the region C changes at the border between where the surface is not covered and where the surface is covered with the monomolecular film, and also when the end position of the monomolecular film changes, the total amount of the water in the region C changes. As a result, the water levels in the region S and in the region D change according to the change of the area of the water surface which the monomolecular film covers, i.e. depending on change of the end position of the monomolecular film.

The change of the water level in the region D causes the effective length of the region C, which influences the compression of the material, and the length of the slope in the region C to be changed, which gives rise to a change in the surface pressure of the monomolecular film in the region C. In addition, fluctuation of the water level in the region S causes the thickness of the water phase which is not covered with the monomolecular film to vary, and this variation causes the compression of the material to be inhomogeneous.

Furthermore, in an apparatus where the end position of the monomolecular film is close to the region S, there is a risk that part of the monomolecular film which has been formed in the region C might intrude into the region S. The LB film-forming material cannot be compressed uniformly in the region S. Furthermore, when the apparatus is in use, the material spread on the region S might not be transferred smoothly to the region C and material might be left in the region S which would bring about a local increase in the surface pressure. A homogeneous monomolecular film is difficult to obtain by such an apparatus.

As described above, the fluctuation of the surface pressure causes the water level to fluctuate, and also the fluctuation of the water level causes the surface pressure to fluctuate so the two control loops affect each other and the water level and the surface pressure cannot be controlled independently. This mutual influence is shown in FIG. 3 by a dotted line. Therefore, even when the parameters of the two loops are optimised, the fluctuations of the water level and the surface pressure are difficult to completely eliminate.

For example, where the surface pressure on the monomolecular film in the region D is set in the range from 20 to 40 mN/m and then controlled to maintain the set surface pressure, it is difficult to suppress the fluctuations to within 10% of the set value. In addition, if the surface pressure is set lower than 20 mN/m, the fluctuations get worse. Furthermore, the fluctuations tend to get worse with time. If a long time is required to produce an LB film, e.g. where a large substrate is used, a thick LB film is produced, in mass-production of an LB film, or when immersing and raising a substrate for depositing an LB film slowly etc. this tendency might cause some problems about the quality of the LB film.

One way for restricting the fluctuation of the surface pressure is increasing the slope of the water phase in the region C. However, in this case, the flow may become turbulent and the material may not be compressed homogeneously. The slope in the region C must be small, for example, only a few degrees in order that the flow is laminar. Another way for restricting the fluctuations of the surface pressure is keeping the end position of the monomolecular film sufficiently far away from the region S in order that the fluctuation of the area not covered by the monomolecular film does not influence the water level. However, this approach increases the size of the apparatus, and also prolongs the time needed to increase the surface pressure of the monomolecular film after supply of the film-forming material since the interval between spreading of the material on the liquid surface and the material reaching to the end of the monomolecular film which has been formed on the liquid surface is increased. In consequence the speed of response in the second control loop is reduced.

SUMMARY OF THE INVENTION

In view of the above problems, the present invention provides an apparatus for producing a LB film in which the interaction between a control loop for regulating the speed of supply of the LB film forming material, and a control loop for regulating the liquid level is minimized. In consequence, the controllability of the surface pressure may be improved, the repeatability and stability of the film forming operation may be improved and a better quantity LB film may be made.

According to a first aspect of the present invention, there is provided an apparatus for continuously producing Langmuir-Blodgett film comprising a tank having a spreading region for spreading over the surface of liquid in the tank a material from which a monomolecular film can be formed, a compressing region for compressing the material on the liquid surface to form the monomolecular film, and a deposition region for depositing the monomolecular film on a substrate; means for causing liquid to flow continuously from the spreading region to the deposition region through the compression region; first control means for controlling the amount of liquid inflow in response to the water level so as to maintain the water level in the deposition region at a predetermined value; second control means for regulating the supply of the film forming material in response to the surface pressure of the monomolecular film so as to maintain that surface pressure at a predetermined value, wherein the liquid flow is regulated so that thickness of the liquid in the compression region is less than thickness of the liquid flow in the spreading region and thickness of the liquid flow in the deposition region; and a decoupling region is provided between the spreading region and the compression region and is arranged so that the descent of the liquid surface where the flow is about to enter the compression region is greater than the descent of the liquid surface flowing through the compression region. Further, the first and second control means are arranged to independently regulate surface pressure and liquid levels.

According to another aspect of the present invention, there is provided a process for producing LB film by using an apparatus as aforesaid, the process comprising dissolving the material for the LB film in a solvent; and then spreading the material on the liquid surface in the region S.

The inventors have found experimentally that the prevention of backflow of the material toward the spreading region S suppresses the fluctuations of the surface pressure and the fluctuation of the water level. The reason why the fluctuations are suppressed is not clear, but the explanation is beleived to be as follows. The quality of the monomolecular film formed on the liquid surface is improved by the prevention of the backflow. As a result, where the liquid level fluctuates, this fluctuation does not cause rapid fluctuation of the surface pressure so that the interaction between the control loop for regulating the surface pressure of the monomolecular film and the control loop for regulating the liquid level of the monomolecular film in the compression region decreases and then a homogenous LB film can be stably obtained. In addition, according to the inventors' experiment, it has been found that the decoupling region effectively prevents backflow.

BRIEF DESCRIPTION OF THE DRAWINGS

An embodiment of the invention will now be explained, by way of example only, with reference to the accompanying drawings in which.

Figure 1:
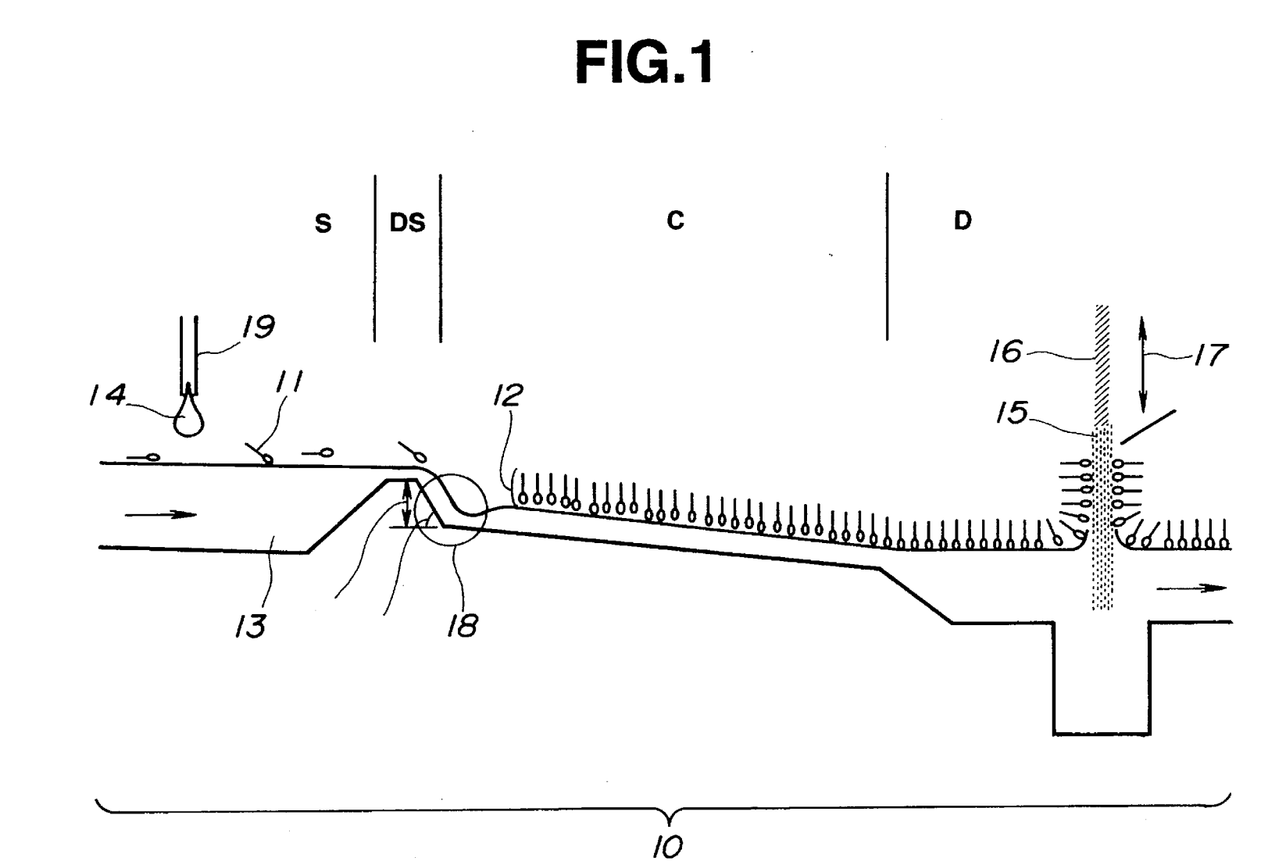
FIG. 1 is a schematic view showing an apparatus for producing an LB film.

Referring to FIG. 1, the apparatus has a channel 10 having a spreading region (S), a decoupling region (DS), a compressing region (C) and a depositing region (D). Pure water or other liquid flows from the region S to the region D through the region DS and the region C. In the region S, solution 14 containing a material of which the LB film consists is spread from a nozzle 19 onto the surface of the flowing liquid where it disperses so that molecules 11 of the material spread over the liquid phase 13. Subsequently, the flow of liquid transports the spread molecules 11 to the region C through the region DS. The material is compressed in the region C and the solvent is evaporated in the regions C and D so as to form a monomolecular film in which each of the molecules 11 is oriented to the same direction. In order to compress the material uniformly, the flow should be smooth and stable. The bottom surface of the tank in the region C preferably falls gently toward the region D and in this embodiment, the angle of the bottom surface was set at 0.24 degrees. The preferred angle of the slope provided by the bottom surface of the compression region is from 0.1 to 2 degrees.

In the region D, a substrate 15 attached to a transferring means 16 is moved repeatedly in the perpendicular direction to the liquid surface as shown by arrows 17 so as to be immersed in the liquid and then raised, whereby monomolecular films 12 are deposited on the substrate 15 and an LB film is obtained. Deposition of 50 or more layers is preferred. In the present apparatus, rapid liquid descent takes place in the decoupling region (DS) in order to prevent backflow of the material of the monomolecular film. The water level at the outlet from the region S is higher than that at the entrance to the region C, and these are connected by a relatively rapidly descending liquid surface in the region DS (18), i.e. the angle of descent is larger than that of the descending liquid surface in the region C.

In order to provide the descending liquid surface in the region DS, the bottom surface in the region DS which descends toward the region C has an angle of descent which is larger than the angle of descent of the bottom surface in the region C. The bottom surface in the region DS may define a liquid path that descends abruptly from the region S into the region DS.

The angle ($\theta$) of the descending bottom surface in the region DS is preferably from 5 to 30 times the angle of the bottom surface in the region C. For example, the descending bottom surface in the region DS preferably has an angle of 2 to 10 degrees with reference to the horizontal, and in this embodiment, the angle is 5 degrees. In addition, the abrupt descent in the region DS preferably has a height (h) of 1 to 5 mm so as to minimize the occurrence of a turbulent flow around the region DS. The height (h) is the difference between the highest lower surface in the region DS and the highest bottom surface in the region C, and in this embodiment, the height (h) is 2 mm. In an embodiment of the present apparatus provided with a region DS, the fluctuation of the surface pressure of the monomolecular film in the region D can be suppressed to within 10% of the predetermined surface pressure.

Next, materials which can make an LB film using the apparatus described above and fluctuations of the surface pressure when these materials are used will be explained.

A vast range of film forming materials can be used provided that they can form an LB film using a conventional LB film producing apparatus. Examples of the materials include polymers such as polyisobutylmethacrylate (PIBM), polylactic acid (PLA), polyamic acid which is a precursor of polyimide etc. and low molecular weight materials such as fatty acids e.g. docosanoic acid and 22-tricosanoic acid. Polyamic acid is a material of formula.

The above materials may be dissolved into a suitable organic solvent such as chloroform to provide a solution which then is spread dropwise onto the water phase.

When an LB film was formed using the apparatus in accordance with the embodiment of the invention with the material described above, predetermined surface pressure on the monomolecular film in the region C and the maximum fluctuation of the surface pressure are shown in Table 1. Further, the maximum fluctuation of the surface pressure of the monomolecular layer which was formed by using an apparatus which did not have the region DS is shown in Table 1.

TABLE 1

| Material | Predetermined surface pressure | Maximum fluctuation with region DS (h = 2 mm) | without region DS |
|---|---|---|---|
| PIBM | 10 (mN/m) | ±0.5 (mN/m) | ±3 (mN/m) |
| PLA | 6 | ±0.5 | ±3 |
| polyamic acid | 30 | ±0.8 | ±4 |
| docosanoic acid | 27 | ±0.7 | ±4 |
| 22-tricosanoic acid | 27 | ±0.7 | ±4 |

As described in Table 1, when docosanic acid was used as the film forming material, the fluctuation of the surface pressure in the region D could be suppressed to ±3% of the predetermined surface pressure and at least 4000 layers of the monomolecular film could be deposited continuously on a 3 inch diameter silicon wafer. Deposition took about 1000 minutes. Further, when the LB film made up of 4000 layers of docosanoic acid monomolecular film was observed using a polarizing microscope, a clear domain structure could be observed showing that the monomolecular films were produced uniformly in each step.

In case of setting a predetermined surface pressure, the effect of the region DS is clearly apparent. For example, in the case where an LB film was produced by using PIBM with an apparatus which did not have the region DS, the surface pressure fluctuated by about ±30% of the predetermined value. Although it was attempted to form an LB film on the 3 inch diameter silicon wafer, after 13 minutes had elapsed and 50 layers of monomolecular film had been deposited, control of the surface pressure could not be maintained and oscillation developed. In contrast, using the apparatus of the embodiment according to the present invention as has already been described, the fluctuation of the surface pressure was suppressed within ±5% and 4000 layers of monomolecular film could be deposited on the silicon wafer.

Next, 400 layers of PIBM monomolecular film were deposited on a silicon wafer using the apparatus having the region DS to form an LB film and then the optical waveguide characteristics of the LB film at the 633 nm wavelength of light was measured. The optical damping coefficient was 3 dB/cm. In contrast, 400 layers of PIBM monomolecular layers were deposited on a silicon wafer using the apparatus which did not have the region DS and then the optical waveguide characteristics of the LB film at the 633 nm wavelength of light was measured. The optical damping coefficient was 12 dB/cm.

The above examples show that using the apparatus of the invention, a high quality LB film can be produced stably. Using the apparatus of the present invention, an LB film laminated from two or more kinds of monomolecular film which are made of different materials can be produced. The substrate on which the LB film is produced preferably has a flat surface. For example, silicon wafer, glass, mica and a plastic such as polycarbonate can be used. When a silicon wafer or glass is used as the substrate, the surface can be cleaned using cleaning methods known in processes for producing semiconductors, such as the RCA method.

What is claimed is:

1. An apparatus for continuously producing a Langmuir Blodgett film comprising:
   a tank having a spreading region for spreading over a surface of a liquid in the tank a material from which a monomolecular film can be formed, said monomolecular film having a surface pressure, a compression region for compressing the material on the liquid surface to form the monomolecular film, and a deposition region where the monomolecular film becomes deposited on a substrate, said deposition region containing liquid at a set level;
   means for causing liquid to flow continuously from the spreading region to the deposition region through the compression region, said liquid having a measurable depth in each region;
   first control means for controlling an amount of liquid inflow in response to the liquid level so as to maintain the level in the deposition region at the set value;
   second control means for regulating supply of the film forming material in response to the surface pressure of the monomolecular film so as to maintain the surface pressure at a set value;
   the liquid in flow being regulated so that the depth of the liquid flow in the compression region is less than the depth of the liquid flow in the spreading region and the depth of the liquid flow in the deposition region; and
   a decoupling region is provided between the spreading region and the compression region and is arranged so that the liquid surface descends at an angle from the spreading region to the compression region and descends through the compression region to the deposition region, and the angle of descent of the liquid surface where the flow is about to enter the compression region is greater than the angle of descent of the liquid surface flowing through the compression region.

2. The apparatus of claim 1, wherein a bottom surface of the compression region in the tank is flat, and the flat surface descends toward the deposition region.

3. The apparatus of claim 2, wherein the spreading region joins the decoupling region at a position higher than where the compression region joins the decoupling region.

4. The apparatus of claim 3, wherein the difference in positions is 1 mm to 5 mm.

5. The apparatus of claim 1, wherein bottom surfaces of the compression region and of the decoupling region are flat and both of the bottom surfaces slope downstream with reference to the direction of liquid flow.

6. The apparatus of claim 5, wherein an angle of a slope is provided by the bottom surface for the compression region, said angle being from 0.1 to 2 degrees.

7. The apparatus of claim 5, wherein an angle of slope is provided by the bottom surface of the decoupling region, said angle being from 2 to 10 degrees.

8. An apparatus according to claim 1, for continuously producing a Langmuir Blodgett film by spreading a source of a film forming material over a surface of a liquid and compressing the film forming material from a loosely packed state to a tightly packed monomolecular film as the liquid advances under non-turbulent flow conditions, wherein control means are arranged for independently regulating surface pressure and liquid level and so that fluctuations in the surface pressure do not cause fluctuations in the water level, and fluctuations in the water level do not cause fluctuations in the surface pressure.

9. A process for applying a monomolecular film on a substrate which comprises immersing the substrate into liquid having a surface layer of monomolecular film made using the apparatus of claim 1.

10. A process for producing a Langmuir Blodgett film according to claim 9, wherein the film forming material for forming the monomolecular film comprises a polymer selected from polyisobutylmethacrylate, polylactic acid and polyamic acid or a derivative thereof.

11. A process for producing a Langmuir Blodgett film according to claim 9, wherein the film forming material for forming the monomolecular film is a fatty acid.

12. A process for producing a Langmuir Blodgett film according to claim 11, wherein the fatty acid is selected from docosanoic acid and 22-tricosanoic acid.

13. A process for producing a Langmuir Blodgett film according to claim 9, wherein the substrate is a silicon wafer or glass.

14. A process for producing a Langmuir Blodgett film according to claim 9, wherein the substrate is mica or polycarbonate.

15. The process of claim 9, where the substrate is repeatedly immersed to form a multilayer film.

16. The process of claim 15 wherein the multilayer film has more than 50 layers.

17. A process for producing a Langmuir-Blodgett film using an apparatus according to claim 1, the process comprising dissolving material for the Langmuir Blodgett film in a solvent, spreading the material on the surface of a liquid in the tank and then depositing said material on the substrate in the depositing region.

* * * * *

UNITED STATES PATENT AND TRADEMARK OFFICE
CERTIFICATE OF CORRECTION

PATENT NO. : 5,599,589

DATED : February 4, 1997

INVENTORS : Otto Albrecht et al.

Page 1 of 2

It is certified that error appears in the above-identified patent and that said Letters Patent is hereby corrected as shown below:

ON TITLE PAGE

Title: "MONO" should read --MONO- --.

COLUMN 1

Line 2,   "MONO" should read --MONO- --;
   Line 14, "depends" should read --depends on--.

COLUMN 5

Line 8,   "optimised," should read --optimized,--.

COLUMN 6

Line 26, "beleived" should read --believed--.

COLUMN 9

Line 24, "Langmuir" should read --Langmuir- --.

COLUMN 10

Line 19, "Langmuir" should read --Langmuir- --;
   Line 32, "Langmuir" should read --Langmuir- --;
   Line 37  "Langmuir" should read --Langmuir- --;

UNITED STATES PATENT AND TRADEMARK OFFICE
CERTIFICATE OF CORRECTION

PATENT NO. : 5,599,589

DATED : February 4, 1997

INVENTORS : Otto Albrecht et al.

It is certified that error appears in the above-identified patent and that said Letters Patent is hereby corrected as shown below:

COLUMN 10 continued

Line 40, "Langmuir" should read --Langmuir- --;
Line 43, "Langmuir" should read --Langmuir- --;
Line 46, "Langmuir" should read --Langmuir- --;
Line 49, "where" should read --wherein--;

Line 54, "Langmuir" should read --Langmuir- --.

Signed and Sealed this

Eighteenth Day of November 1997

Attest:

BRUCE LEHMAN

*Attesting Officer*  *Commissioner of Patents and Trademarks*